United States Patent
Gladisch et al.

(10) Patent No.: US 12,223,696 B2
(45) Date of Patent: Feb. 11, 2025

(54) COMPUTER-IMPLEMENTED METHOD FOR TESTING CONFORMANCE BETWEEN REAL AND SYNTHETIC IMAGES FOR MACHINE LEARNING

(71) Applicant: Robert Bosch GmbH, Stuttgart (DE)

(72) Inventors: Christoph Gladisch, Renningen (DE); Christian Heinzemann, Ludwigsburg (DE); Matthias Woehrle, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 572 days.

(21) Appl. No.: 17/649,175

(22) Filed: Jan. 27, 2022

(65) Prior Publication Data
US 2022/0262103 A1    Aug. 18, 2022

(30) Foreign Application Priority Data
Feb. 16, 2021    (DE) ...................... 10 2021 201 445.3

(51) Int. Cl.
*G06V 10/776*    (2022.01)
*G06V 10/774*    (2022.01)
*G06V 10/98*    (2022.01)

(52) U.S. Cl.
CPC .......... *G06V 10/776* (2022.01); *G06V 10/774* (2022.01); *G06V 10/993* (2022.01)

(58) Field of Classification Search
None
See application file for complete search history.

(56) References Cited

U.S. PATENT DOCUMENTS

| | | | | |
|---|---|---|---|---|
| 10,460,208 | B1 * | 10/2019 | Atsmon | G06V 20/64 |
| 11,507,779 | B1 * | 11/2022 | Amouie | G06F 18/214 |
| 2022/0230303 | A1 * | 7/2022 | Karaoglu | A61B 34/20 |

OTHER PUBLICATIONS

Alexey Dosovitskiy et al. "CARLA: An Open Urban Driving Simulator" 1st Conference on Robot Learning (CoRL) 2017, Mountain View, United States. Retrieved from the Internet on Jan. 27, 2022: https://arxiv.org/abs/1711.03938. 16 Pages.
Chan, et al.: "Sensitivity Analysis of Model Output: Variance-Based Methods Make the Difference", Proceedings of 1997 Winter Simulation Conference, 261-268.
Jordon, et al.: "Measuring the quality of Synthetic data for use in competitions", 2018, arXiv:1806.11345, pp. 1-3.
Poibrenski, et al..: "Toward a Methodology for Training with Synthetic Data on the Example of Pedestrian Detection in a Frame-by-Frame Semantic Segmentation Task", 2018 IEEE/ACM 1st International Workshop on Software Engineering for AI in Autonomous Systems (SEFAIAS), IEEE, 2018, pp. 31-34.

* cited by examiner

*Primary Examiner* — Miya J Cato
(74) *Attorney, Agent, or Firm* — NORTON ROSE FULBRIGHT US LLP; Gerard A. Messina

(57) ABSTRACT

A computer-implemented method for testing conformance between images generated by a synthetic image generator and images obtained from authentic visual data. A conformance test result results from comparing results of global sensitivity analyses used to rank the effect of visual parameters on the computer vision model both for synthetic and authentic visual data.

19 Claims, 8 Drawing Sheets

COMPUTER-IMPLEMENTED METHOD FOR TESTING CONFORMANCE BETWEEN REAL AND SYNTHETIC IMAGES FOR MACHINE LEARNING

CROSS REFERENCE

The present application claims the benefit under 35 U.S.C. § 119 of German Patent Application No. 10 2021 201 445.3 filed on Feb. 16, 2021, which is expressly incorporated herein by reference in its entirety.

FIELD

The present invention relates to a computer-implemented method for testing conformance between images generated by a synthetic image generator and images obtained from authentic visual data, a computer-implemented method for producing safety-enhanced computer vision based on a computer vision model, and an associated apparatus, computer program, computer readable medium, and distributed data communications system.

BACKGROUND INFORMATION

Computer vision concerns how computers can automatically gain high-level understanding from digital images or videos. Computer vision systems are finding increasing application to the automotive or robotic vehicle field. Computer vision can process inputs from any interaction between at least one detector and the environment of that detector. The environment may be perceived by the at least one detector as a scene or a succession of scenes.

In particular, interaction may result from at least one electromagnetic source, which may or may not be part of the environment. Detectors capable of capturing such electromagnetic interactions can, for example, be a camera, a multi-camera system, a RADAR or LIDAR system.

In automotive computer vision systems, systems computer vision often has to deal with open context, despite also being required to be safety-critical.

SUMMARY

According to a first aspect of the present invention, there is provided a computer-implemented method for testing a conformance between images generated by a synthetic image generator and images obtained from authentic visual data. In accordance with an example embodiment of the present invention, the method comprises:
  obtaining a computer vision model in an initial training state configured to perform a computer vision function;
  obtaining a visual parameter set comprising a plurality of visual parameters;
  generating a synthetic visual data set comprising synthetic visual data and groundtruth data according to the visual parameter set, and sampling an authentic visual data set comprising authentic images and groundtruth data according to the visual parameter set;
  applying the computer vision model to the synthetic visual data set and the authentic visual data set, to thus obtain a predicted synthetic visual data set and a predicted authentic visual data set, and generating a plurality of synthetic and authentic performance scores over the plurality of visual parameters of the visual parameter set, wherein each performance score is a comparison of an item of predicted synthetic visual data or predicted authentic visual data with a corresponding item of groundtruth data;
  generating a first sensitivity measure of the plurality of synthetic performance scores over the plurality of visual parameters, and generating a second sensitivity measure of the plurality of authentic performance scores over the plurality of visual parameters, or generating a combined sensitivity measure based on a difference between corresponding synthetic and authentic performance scores over the plurality of visual parameters; and
  generating a conformance result defining the conformance between images generated by the synthetic image generator and images obtained from the authentic visual data at the same or similar visual parameter of the visual parameter set by (1) comparing the first sensitivity measure and the second sensitivity measure, or (2) generating the conformance result based on the combined sensitivity measure.

In accordance with an example embodiment of the present invention, the method according to the first aspect further comprises comparing the first sensitivity measure and the second sensitivity measure, and returning a conformance result based on a predetermined criterion.

In a first output option (1), the first and sensitivity measures are two ranked lists showing the performance of the computer vision model across the range of visual parameters for authentic, and synthetic image data. A discrepancy between the rankings of the ranked lists of visual parameters indicates that the computer vision model has performed in a different way when applied to synthetic image data, as compared to the authentic image data. A user or automated system may make use of this finding in many ways. For example, visual parameters in the ranking corresponding to the synthetic image data that deviate in ranked position from visual parameters in the ranking corresponding to the authentic image data can be omitted from further use or analysis.

In a second output option (2), a combined sensitivity measure is obtained which takes into account deviations (performance deltas) between the performance results of authentic and synthetic image data on a more granular level. The sensitivity analysis is then performed taking into account all of the performance deltas.

In other words, according to option (1), separate sensitivity rankings of visual parameters are computed, one for the authentic visual data, and one for the synthetic visual data. However, according to option (2), a single ranking of visual parameters is provided, for example, summarizing for each visual parameter the relative performance of that visual parameter relative to authentic or synthetic data acquisition. In an example, a visual parameter ranked at the top of the list may imply that, for the specific computer vision model, there is no difference between taking the visual data from an authentic or a synthetic source. In an example, a visual parameter ranked at the bottom of the list may imply that, for the specific computer vision model, the visual data should not be taken from a synthetic source.

In an example, an adjusted synthetic image generator may be configured to ignore such deviant visual parameters. This means that at least synthetic image data generated by the adjusted synthetic image generator does not comprise synthetic image data in regions of the visual parameter space that cause deviant performance of the computer vision model, compared to authentic image data having the same or similar parameter values.

In an example, visual parameters may be identified that lead to performance deviations of the computer vision model when applied to synthetic data. Experts can obtain instructions from the visual parameters representing a performance deviation of the synthetic image data as compared with the authentic image data. This enables experts to use the visual parameters that lead to performance deviations as an experimental specification useable to obtain more authentic image data for training the computer vision model, for example.

The method according to the first aspect is advantageously used to validate whether or not synthetically generated visual data set can be used, instead of an authentic visual data set when training and/or testing a computer vision model.

In particular, samples of authentic visual data and synthetically generated visual data having common, or similar visual parameters selected from a world parameter model can be compared. If, for a common, or similar setting of visual parameters, a computer vision model performs above a required threshold when predicting samples of authentic visual data and synthetically generated visual data having common, or similar settings of visual parameters, the synthetically generated visual data can be used for the corresponding settings of visual parameters in combination with the computer vision model.

Contrarily, if, for a common, or similar setting of visual parameters, a computer vision model performs below a required threshold when predicting samples of authentic visual data and synthetically generated visual data having common, or similar settings of visual parameters, a determination is made that the synthetically generated visual data cannot be used for the corresponding settings of visual parameters in combination with the computer vision model.

Furthermore, a synthetic image generator may be improved, or retrained with more detailed data in portions of the visual parameter set that lead to poor performance, thus leading to an improved synthetic image generator.

Furthermore, use instructions of a synthetic image generator may be obtained. When a ranking of visual parameters leading to better or worse performance in combination with a specific computer vision model is obtained, visual parameters leading to a ranked low performance may be omitted from a test scenario.

Therefore, an improved synthetic data generator is provided, because in practical terms the generation of a large amount of synthetic visual data is requires less experimental activity and is more resistant to experimental variation than attempting to capture and manually label a large amount of authentic visual data.

A method according to a second aspect of the present invention comprises a computer-implemented method for producing a synthetic image generator tested using a computer vision model. In accordance with an example embodiment of the present invention, the method comprises:

testing conformance of a synthetic image generator according to the computer-implemented method of the first aspect;

if the conformance result is negative, adjusting the synthetic image generator and/or amending one or more of the plurality of visual parameters (ODD) of the visual parameter set, and repeating the previous testing step, until the conformance result is positive; and outputting the adjusted synthetic image generator.

In accordance with an example embodiment of the present invention, the computer-implemented method according to the second aspect, further comprises:

obtaining a set of training data using the adjusted synthetic image generator, wherein the synthetic image generator is configured using the amended one or more of the plurality of visual parameters (ODD) of the visual parameter set; and either: (1) outputting the set of synthetic training data, or (2) training a further computer vision model from an initial training state based on the set of synthetic training data; and subsequently outputting the computer vision model.

The method according to the second aspect is advantageously used to ensure that synthetic training data the computer vision model is trained on is a valid surrogate for authentic training data.

According to a third aspect of the present invention, there is provided an apparatus for testing a conformance between images generated by a synthetic image generator and images obtained from authentic visual data.

In accordance with an example embodiment of the present invention, the apparatus comprises an input interface, a processor, a memory and an output interface.

The input interface is configured to obtain a computer vision model in an initial training state configured to perform a computer vision function, and wherein the input interface is further configured to obtain a visual parameter set comprising a plurality of visual parameters, and to store the computer vision model and the visual parameter set in the memory.

The processor is configured to generate a synthetic visual data set comprising synthetic visual data and groundtruth data according to the visual parameter set, and to sample an authentic visual data set comprising authentic images and groundtruth data according to the visual parameter set, to apply the computer vision model to the synthetic visual data set and the authentic visual data set to generate a plurality of synthetic and authentic performance scores over the plurality of visual parameters of the visual parameter set, to analyse the sensitivity of the plurality of synthetic and authentic performance scores over the plurality of visual parameters of the visual parameter set, and to generate rankings of the plurality of visual parameters of the visual parameter set for the synthetic, and authentic visual data, and to compare the rankings of the visual parameters for the synthetic, and authentic visual data.

The output interface is configured to return a conformance result based on a predetermined criterion.

A fourth aspect of the present invention relates to a computer program comprising machine-readable instructions which, when executed by a processor, is capable of carrying out either (i) the computer-implemented method of the first aspect, and/or (ii) the computer-implemented method of the second aspect.

A fifth aspect of the present invention relates to a computer readable medium comprising one or both of the computer programs.

A sixth aspect of the present invention relates to a distributed data communications system comprising a data processing agent, a communications network and a terminal device, wherein the terminal device is optionally comprised within an automobile or robot.

The data processing agent is configured to transmit the computer vision model trained according to the method of the second aspect to the terminal device via the communications network.

Other embodiments of the aforementioned aspects are explained in the following description, to which the reader should now refer.

A synthetic visual data set is a set of items representing either an image, such as JPEG or GIF images, wherein the items are generated synthetically. The synthetic visual data set may comprise synthetically generated videos in MPEG format, for example.

An authentic visual data set is a set of items representing either an image, such as JPEG or GIF images, or a video. The items are either captured by a capturing device, for example, a camera, or selected from a database comprising authentic visual data.

An item of groundtruth data corresponding to one item of synthetic or authentic visual data is a classification and/or regression result that the computer vision function is intended to output. In other words, the groundtruth data represents a correct answer of the computer vision function when input with an item of visual data showing a predictable scene or element of a scene. The term image may relate to a subset of an image, such as a segmented road sign or obstacle.

A computer vision model is a function parametrized by model parameters that, upon training, can be learned based on the training data set using machine learning techniques. The computer vision model is configured to at least map an item of synthetic or authentic visual data or a portion, or subset thereof to an item of predicted groundtruth data. One or more visual parameters define a visual state in that they contain information about the contents of an observed scene and/or represent boundary conditions for capturing and/or generating the observed scene.

The present invention provides a conformance test to determine whether or not images and groundtruth generated by a synthetic image generator are equivalent, or close, to images and groundtruth obtained from real visual data. The conformance test is based on comparing the relevance of visual parameters that images have been generated or sampled for. The specification also provides ways to adjust the visual parameters so as to achieve (positive) conformance. Conformance can be seen as a quantitative measure of whether or not synthetic images and corresponding groundtruth can be reliably used for testing and training the computer vision function. Upon adjustment, a set of visual parameter set with positive conformance can be produced.

As a general example, the reference of the synthetic data generator is real data, which is physically captured, thus the real data can be seen as part of the specification/requirement. The synthetic data generator and the real data are compared by testing the computer vision function using data from both sources and using a global sensitivity analysis with respect to the visual parameters. If the performance of the computer vision function is sensitive with respect to one parameter on the real data, but not a parameter on the synthetic data, this means that the synthetic data does not properly implement the visual parameter. In this case the conformance test result is negative. In an embodiment, this parameter is then dropped from the parameter list. In an embodiment, the synthetic data generator is modified. If the performance of synthetic data and real data is similar with respect to a visual parameter, i.e., the conformance test result 49 is positive, then the implementation of the parameter when generating the synthetic images and groundtruth is correct, and can be used in the verification of the CV-function.

DETAILED DESCRIPTION OF EXAMPLE EMBODIMENTS

Figure 1:
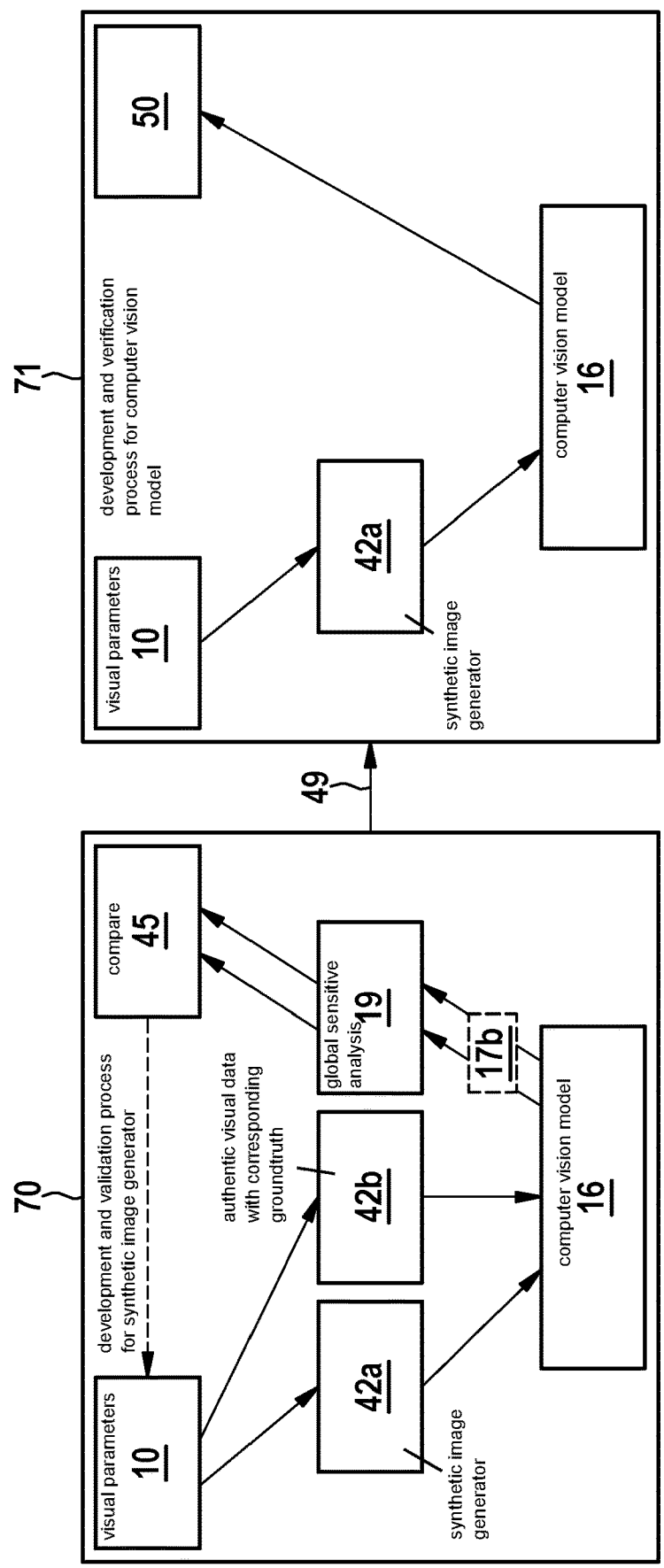
FIG. 1 schematically illustrates a development and validation process for a synthetic image generator and a development and verification process of a computer vision model using the synthetic image generator, in accordance with an example embodiment of the present invention.

Computer vision concerns with how computers can automatically gain high-level understanding from digital images or videos. In particular, computer vision may be applied in the automotive engineering field to detect road signs, and the instructions displayed on them, or obstacles around a vehicle.

To achieve this, one, or more of object detection, semantic segmentation, 3D depth information, navigation instructions for autonomous system may be computed. Another common term used for computer vision is computer perception. In fact, computer vision can process inputs from any interaction between at least one detector 440a, 440b and its environment. The environment may be perceived by the at least one detector as a scene or a succession of scenes. In particular, interaction may result from at least one electromagnetic source (e.g. the sun) which may or may not be part of the environment. Detectors capable of capturing such electromagnetic interactions can e.g. be a camera, a multi-camera system, a RADAR or LIDAR system, or infra-red. An example of a non-electromagnetic interaction could be sound waves to be captured by at least one microphone to generate a sound map comprising sound levels for a plurality of solid angles, or ultrasound sensors.

Computer vision is an important sensing modality in automated or semi-automated driving. In the following description, the term "autonomous driving" refers to fully autonomous driving, and also to semi-automated driving where a vehicle driver retains ultimate control and responsibility for the vehicle. Applications of computer vision in the context of autonomous driving and robotics are detection, tracking, and prediction of, for example: drivable and non-drivable surfaces and road lanes, moving objects such as vehicles and pedestrians, road signs and traffic lights and potentially road hazards.

Computer vision has to deal with open context. It is not possible to experimentally model all possible visual scenes. Machine learning—a technique which automatically creates generalizations from input data may be applied to computer vision. The generalizations required may be complex, requiring the consideration of contextual relationships within an image.

For example, a detected road sign indicating a speed limit is relevant in a context where it is directly above a road lane that a vehicle is travelling in, but it might have less immediate contextual relevance if it is not above the road lane that the vehicle is travelling in.

Deep learning-based approaches to computer vision have achieved improved performance results on a wide range of benchmarks in various domains. In fact, some deep learning network architecture implement concepts such as attention, confidence, and reasoning on images. As industrial application of complex deep neural networks (DNNs) increases, there is an increased need for verification and validation (V&V) of computer vision models, especially in partly or fully automated systems where the responsibility for interaction between machine and environment is unsupervised. Computer vision can contribute to fulfilling the norm "Safety of the intended functionality" (SOTIF) as required by automated driving for level 4 or 5.

Testing a computer vision function or qualitatively evaluating its performance is challenging because the input space of a typical computer vision function is large. Theoretically, the input space consists of all possible images defined by the combination of possible pixel values representing e.g. colour or shades of grey given the input resolution. However, creating images by random variation of pixel values will not produce representative images of the real world with a reasonable probability. Therefore, a visual dataset consists of real (e.g. captured experimentally by a physical camera) or synthetic (e.g. generated using 3D rendering, image augmentation, or DNN-based image synthesis) images or image sequences (videos) which are created based on relevant scenes in the domain of interest, e.g. driving on a road.

In industry, testing is often called verification. Even in a restricted input domain, the input space can be extremely large. Images (including videos) can, e.g., be collected by randomly capturing the domain of interest, e.g., driving some arbitrary road and capturing images, or by capturing images systematically based on some attributes/dimensions/parameters in the domain of interest. While it is intuitive to refer to such parameters as visual parameters, it is not required that visual parameters relate to visibility with respect to the human perception system. It suffices that visual parameters relate to visibility with respect to one or more detectors.

One or more visual parameters define a visual state of a scene because it or they contain information about the contents of the observed scene and/or represent boundary conditions for capturing and/or generating the observed scene.

The visual parameters can be for example: camera properties (e.g., spatial- and temporal-sampling, distortion, aberration, colour depth, saturation, noise etc.), LIDAR or RADAR properties (e.g., absorption or reflectivity of surfaces, etc.), light conditions in the scene (light bounces, reflections, light sources, fog and light scattering, overall illumination, etc.), materials and textures, objects and their position, size, and rotation, geometry (of objects and environment), parameters defining the environment, environmental characteristics like seeing distance, precipitation-characteristics, radiation intensities (which are suspected to strongly interact with the detection process and may show strong correlations with performance), image characteristics/statistics (such as contrast, saturation, noise, etc.), domain-specific descriptions of the scene and situation (e.g., cars and objects on a crossing), etc. Many more parameters are possible.

These parameters can be seen as an ontology, taxonomy, dimensions, or language entities. They can define a restricted view on the world or an input model. A set of concrete images can be captured or rendered given an assignment/a selection of visual parameters, or images in an already existing dataset can be described using the visual parameters. The advantage of using an ontology or an input model is that for testing an expected test coverage target can be defined in order to define a test end-criterion, for example using t-wise coverage, and for statistical analysis a distribution with respect to these parameters can be defined.

Box 1. Example of a "world model" providing a set of visual parameters in Python code.

```
#The world model corresponds to (10)
worldmodel = OrderedDict([ ('spawn_point', [0,3,6,9,12,15]),
    ('cam_yaw', [-20, -10, 0, 10, 20]),
    ('cam_pitch', [-10, -5, 0, 5, 10]),
    ('cam_roll' , [-10, -5, 0, 5, 10]),
    ('cloudyness', [0, 33, 66, 100]),
    ('precipitation', [0, 50, 100]),
    ('precipitation_deposits', [0, 50, 100]),
    ('sun_altitude_angle', [-10, 0, 33, 66, 100]),
    ...('sun_azimuth_angle', [0, 45, 90, 135, 180, 225, 270]),])
```

Box 1 schematically illustrates an example pseudocode listing for defining a world model of visual parameters and for a sampling routine. The pseudocode, in this example, comprises parameter ranges for a spawn point, a cam yaw, a cam pitch, a cam roll, cloudiness, precipitation, precipitation deposits, sun inclination (altitude angle), sun azimuth angle. Moreover, an example implementation for a sampling algorithm 11 based on all-pair testing is shown.

Images, videos, and other visual data along with co-annotated other sensor data (GPS-data, radiometric data, local meteorological characteristics) can be obtained in different ways. Real images or videos may be captured by an image capturing device such as a camera system. Real images may already exist in a database and a manual or automatic selection of a subset of images can be done given visual parameters and/or other sensor data. Visual parameters and/or other sensor data may also be used to define required experiments. Another approach can be to synthesize images given visual parameters and/or other sensor data. Images can be synthesized using image augmentation techniques, deep learning networks (e.g., Generative Adversarial Networks (GANs), Variational Autoencoders (VAEs)), and 3D rendering techniques. A tool for 3D rendering in the context of driving simulation is for example the CARLA tool (Koltun, 2017, available at www.arXiv.org: 1711.03938).

Conventionally, in development and testing of computer vision functions, the input images are defined, selected, or generated based on properties (visual parameters) that seem important according to expert opinion. However, the expert opinion relating to the correct choice of visual parameters may be incomplete, or mislead by assumptions caused by the experience of human perception. Human perception is based on the human perception system (human eye and visual cortex), which differs from the technical characteristics of detection and perception using a computer vision function.

In this case, the computer vision function (viz. computer vision model) may be developed or tested on image properties, which are not relevant, and visual parameters, which are important influence factors may be missed or underestimated. Furthermore, a technical system can detect additional characteristics as polarization, or extended spectral ranges that are not perceivable by the human perception system.

Training and testing a computer vision model requires a large amount (for example, >1e4, >1e5, >1e6, >1e7, >1e8, >1e9, >1e10) of items of visual data and corresponding groundtruth. A standard way to train and/or test a computer vision model 16 is to use a plurality of items of authentic (in other words, real) visual data, and corresponding groundtruth data as training data or validation data.

The groundtruth (for example, labels) defines the expected output of the computer vision function and thus defines the correct test results. However, manually defining the groundtruth such as for example labelling images or videos is expensive and error-prone. Instead items of visual data and corresponding groundtruth data are often synthesized. As an example, it is possible to increase the number of items of visual data and corresponding groundtruth by using techniques such as image augmentation or 3D rendering. As another example, new images or videos with groundtruth can be generated by imposing or changing visual parameters such as, for example, weather conditions.

Typically, the authentic visual data is obtained by sampling regions of the world model defined by expert opinion.

Box 2. Example Python code for sampling the world model of Box 1.

```
# The sampling algorithm corresponds to (11)
#wmPairs = { k:[ ] for k in worldmodel.keys( ) }
df = DataFrame(columns=worldmodel.keys( ))
#Ensure that projection on each dimension still guarantees
pair-wise coverage on the subspace
for dim in worldmodel.keys( ):
    for dim_val in worldmodel[dim]:
        wm_subspace = worldmodel.copy( )
        wm_subspace[dim] = [dim_val]
        for row in AllPairs(wm_subspace.values( )):
            df.loc[len(df)] = row
df.drop_duplicates( )
#The output is df and corresponds to (12) desired_combis.csv
```

However, it is not clear to what extent a computer vision model that has been trained and tested at least to some extent on synthetic visual data and corresponding groundtruth data can be trusted, when eventually testing or using the computer vision model in real life obtaining authentic visual data, for example, from a physical camera system. This can be problematic as computer vision in automated driving systems is safety critical. The present invention provides a way to analyse and enable the use of synthetic visual data and corresponding groundtruth data for training and testing a computer vision model.

Box 2 shows an example pseudocode listing for evaluating a sensitivity of a visual parameter according to a first alternative. In code lines (#)34, (#)35, (#)36 other arithmetic operations such as, e.g., the computation of a standard deviation can be used.

In particular, the present invention provides different ways to apply a sensitivity analysis to the visual parameters predicted by the model.

In general, sensitivity analysis (or, narrower, global sensitivity analysis) can be seen as the numeric quantification of how the uncertainty in the output of a model or system can be divided and allocated to different sources of uncertainty in its inputs. This quantification can be referred to as sensitivity, or robustness. In the context of this specification, the model can, for instance, be taken to be the mapping, $$\Phi: X \to Y$$

from visual parameters (or visual parameter coordinates) $X_i$, $i=1, \ldots, n$ based on which items of visual data have been captured/generated/selected to yield performance scores (or performance score coordinates) $Y_j, j=1, \ldots, m$ based on the predictions and the groundtruth.

A variance-based sensitivity analysis sometimes also referred to as the Sobol method or Sobol indices is a particular kind of (global) sensitivity analysis. To this end, samples of both input and output of the aforementioned mapping $\Phi$ can be interpreted in a probabilistic sense. In fact, as an example a (multi-variate) empirical distribution for input samples can be generated. Analogously, for output samples a (multi-variate) empirical distribution can be computed. A variance of the input and/or output (viz. of the performance scores) can thus be computed. Variance-based sensitivity analysis is capable of decomposing the variance of the output into fractions which can be attributed to input coordinates or sets of input coordinates. For example, in case of two visual parameters (i.e. n=2), one might find that 50% of the variance of the performance scores is caused by (the variance in) the first visual parameter $(X_1)$, 20% by (the variance in) the second visual parameter $(X_2)$, and 30% due to interactions between the first visual parameter and the second visual parameter. For n>2 interactions arise for more than two visual parameters. Note that if such interaction turns out to be significant, a combination between two or more visual parameters can be promoted to become a new visual dimension and/or a language entity. Variance-based sensitivity analysis is an example of a global sensitivity analysis.

Hence, when applied in the context of this specification, an important result of the variance-based sensitivity analysis is a variance of performance scores for each visual parameter. The larger a variance of performance scores for a given visual parameter, the more performance scores vary for this visual parameter. This indicates that the computer vision model is more unpredictable based on the setting of this visual parameter.

FIG. 1 schematically illustrates a development and validation process 70 for a synthetic image generator 42a and a development and verification process 71 of a computer vision model using the synthetic image generator 42a. Such illustrated models are applied in computer function development as "V-models".

The development and validation process 70 aims at validating a synthetic image generator 42a, which can be seen as an intermediate product that upon validation is used to scale and simplify the development and verification process 71 of the computer vision model 16, the latter being a final product. In the development and validation process 70, a visual parameter set comprising an initial set or plurality of visual parameters 10 is provided.

For each visual parameter of the visual parameter set, an item of synthetic visual data with corresponding groundtruth is generated by the synthetic image generator 42a. At the same time for each visual parameter of the visual parameter set, an item of authentic visual data with corresponding groundtruth is sampled or obtained 42b from a physical capturing device or from a database.

A computer vision model 16 in an initial state is applied to synthetic visual data and corresponding groundtruth. The same computer vision model 16 in the initial state is applied to authentic visual data and corresponding groundtruth. In each case a performance score can be computed based on the item of groundtruth and the item of predicted groundtruth. In each case a global sensitivity analysis 19 on performance scores with respect to the visual parameters 10 can be performed. A result of each global sensitivity analysis 19 can, in an example, be a ranking of visual parameters 10 in terms of their relevance. Such a ranking for generated synthetic visual data and such a ranking for authentic visual data are then compared 45. The result is a conformance test result 49.

If, for example, the performance of the computer vision model is sensitive to one parameter on the authentic visual data 42b but not on the synthetic visual data 42a, this means that the synthetic visual data does not properly implement the visual parameter. In this case the conformance test result 49 can be negative. This parameter can then either be dropped from the parameter list, or the synthetic image generator 42a is adjusted. If the performance of synthetic visual data and authentic visual data is similar with respect to a visual parameter, i.e. the conformance test result 49 can be said to be positive, then the implementation of the parameter in 42a can be deemed correct. The synthetic image generator 42a is then validated and can be used in the verification process 71 of the computer vision model 16.

A first aspect of the present invention relates to a computer-implemented method for testing a conformance between images generated by a synthetic image generator and images obtained from authentic (in other words, real) visual data. Conformance is a quantitative measure indicating how well synthetic visual data and corresponding groundtruth can replace authentic visual data and corresponding groundtruth in training and/or testing a computer vision model 16.

The method according to the first aspect comprises obtaining 110 a computer vision model in an initial training state configured to perform a computer vision function. In other words, the computer vision model is pre-trained, for example, on real visual data and corresponding groundtruth. The computer vision model being pre-trained is not contradictory to later on retraining the computer vision model based on validated synthetic visual data and corresponding groundtruth. Such retraining can be seen as refinement of the computer vision model.

The method according to the first aspect further comprises obtaining 120 a visual parameter set comprising a plurality of visual parameters. One or more visual parameters define a visual state because they contain information about the contents of an observed scene and/or represent boundary conditions for capturing and/or generating the observed scene. For example, the visual parameters may be decided under the influence of an expert, and/or composed using analysis software. The visual parameter set is also referred to as the operational design domain (ODD).

The method according to the first aspect further comprises generating 130a a synthetic visual data set comprising synthetic visual data and groundtruth data according to the visual parameter set, and sampling 130b an authentic visual data set comprising authentic images and groundtruth data according to the visual parameter set.

A synthetic visual data set is a set of items representing either a digital image or a video, the latter being a sequence of images, such as JPEG or GIF images, wherein items are generated synthetically.

An authentic visual data set is a set of items representing either a digital image or a video, the latter being a sequence of images, such as JPEG or GIF images, wherein items are either captured by a capturing device, for example, a camera, or selected from a database comprising authentic visual data and corresponding groundtruth data.

Each item of (authentic or synthetic) visual data can be a numeric tensor with a video having an extra dimension for the succession of frames. An item of groundtruth data corresponding to one item of visual data is, for example a classification and/or regression result that the computer vision model should output in ideal conditions. For example, if the item of visual data is parameterized in part according to the presence of a wet road surface, and the presence, or not of a wet road surface is an intended output of the computer model to be trained, the groundtruth would return a description of that item of the associated item of visual data as comprising an image of a wet road.

Each item of groundtruth data can be another numeric tensor, or in a simpler case a binary result vector. A computer vision model is a function parametrized by model parameters that upon training can be learnt based on the training data set using machine learning techniques. The computer vision model is configured to at least map an item of (synthetic or authentic) visual data or a portion, or subset thereof to an item of predicted groundtruth data.

In an embodiment, the method according to the first aspect further comprises applying (140a for synthetic visual data, 140b for authentic visual data) the computer vision model to the synthetic visual data set and the authentic visual data set, to thus obtain a predicting synthetic visual data set and a predicting authentic visual data set, and generating a plurality of synthetic and authentic performance scores over the plurality of visual parameters of the visual parameter set, wherein each performance score is a comparison of an item of predicting synthetic visual data or predicting authentic visual data with a corresponding item of groundtruth data.

Synthetic or authentic performance scores are labels intended to distinguish performance scores resulting from applying the computer vision model on the synthetic visual data set from those resulting from applying the computer vision model on the authentic visual data set.

The method according to the first aspect further comprises generating 150a a first sensitivity measure of the plurality of synthetic performance scores over the plurality of visual parameters, and generating 150b a second sensitivity measure of the plurality of authentic performance scores over the plurality of visual parameters, or generating a combined sensitivity measure based on a difference between corresponding synthetic and authentic performance scores over the plurality of visual parameters.

As an example, a (first and/or second) sensitivity measure can be a variance of performance scores with respect to visual parameters in the visual parameter set. Alternatively, the (first and/or second) sensitivity measure may be evaluated on subsets, clusters, and/or combinations of visual parameters in the visual parameter set. As an illustration, a combination of two visual parameters could be given in terms of a direction in visual parameter space projecting both onto a dimension of inclination of sun and a dimension of wetness of the road. In view of comparing the first and the second sensitivity measure it can be advantageous to compute the first and second sensitivity according to an identical algorithm. A sensitivity measure can result from a global sensitivity analysis 19.

The method according to the first aspect further comprises generating a conformance result defining the conformance between images generated by the synthetic image generator and images obtained from the authentic visual data at the same or similar visual parameter of the visual parameter set by (1) comparing the first sensitivity measure and the second sensitivity measure, or (2) generating the conformance result based on the combined sensitivity measure.

As will subsequently be detailed, a first option for generating the conformance result applies independent sensitivity analyses in the visual parameter space to the performance scores obtained from application of the computer vision model to the authentic visual data, and then to the synthetic visual data. In other words, the conformance result in the first option is two ranked lists of visual parameters, one in respect of the authentic visual data, and one list in respect of the synthetic visual data.

The position of a visual parameter in each list represents the sensitivity of the computer vision model to that visual parameter. An ideal computer vision model, operating on synthetic visual data generated by an ideal synthetic visual data generator, would result in the first and second ranked lists having exactly the same order of visual parameters. As the computer vision model and/or the synthetic visual data generator becomes less ideal, disparities between the ranking of the visual parameters of the authentic visual data and the synthetic visual data occur.

As will subsequently be detailed, a second option for generating the conformance result applies a combined sensitivity measure resulting in one list of visual parameters in the visual parameter set. The computation of the combined sensitivity measure involves computing one sensitivity analysis over the visual parameter space, based on performance differences identified between each pair of authentic and synthetic visual data having the same or similar visual parameters. The outcome is a single ranked list of visual parameters. A visual parameter occurring at the top of the list, for example, implies that there is no, or minimal, disadvantage to replacing authentic test images with synthetic test images with respect to that visual parameter. A visual parameter occurring at the bottom of the list, for example, implies that there replacing an authentic test image with a synthetic test images with respect to that visual parameter will cause a performance deviation.

The method according to the first aspect is advantageously used to analyze and validate whether or not a generated synthetic visual data set can be used instead of an authentic visual data set in training and/or testing a computer vision model, and thus is capable of improving the computer vision model because in practical terms generation of a large number of synthetic visual data is easier than capturing an equally large number of authentic visual data.

A conformance test result 49 is obtained that can be used as a validation result for synthetic visual data (and at the same time for a synthetic data generator generating the synthetic visual data) by comparing 45 test results with synthetic and authentic visual data.

If the validation result is sufficiently good, for instance, if an expert decides or a predetermined criterion, for example, being given in terms of a threshold on a validation metric, is satisfied, the synthetic visual data can be used for training and/or testing the computer vision model.

Accordingly, factors. i.e. visual parameters 10 are obtained on which the computer vision model performs similarly on synthetic and authentic visual data, and factors on which the evaluation of the computer vision model differs between synthetic and authentic visual data. The test scope that can be tested using synthetic visual data is thus adjusted to a subset where synthetic and authentic visual data can be used interchangeably.

Figure 2:
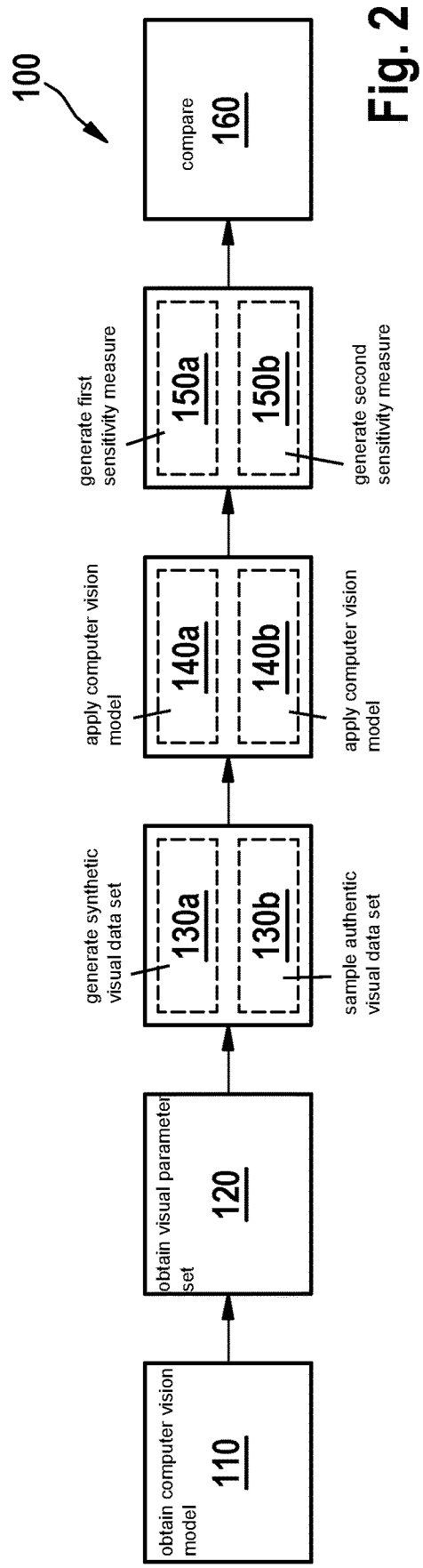
FIG. 2 schematically illustrates a computer-implemented method according to the first aspect for testing a conformance between images generated by a synthetic image generator and images obtained from real visual data, in accordance with an example embodiment of the present invention.

The process of generating synthetic visual data and corresponding groundtruth 42a is, thus, improved by selecting and adjusting the relevant visual parameters and value ranges. This can be seen, for example, as a benefit for data providers. The technique helps to select relevant authentic visual data 42b for validation of the synthetic visual data. The technique helps finding complementary authentic visual data that is not covered by the synthetic visual data. For example, if the synthetic visual data cannot correctly simulate a visual aspect, for instance, fog at night, then such tests should be performed using authentic visual data. Thus, the technique helps to select which authentic visual data should be used 42b complementary to synthetic visual data. FIG. 2 schematically illustrates an example of a computer-implemented method 100 for testing a conformance between images generated by a synthetic image generator and images obtained from real visual data.

As an example, the computer vision model in an initial training state is provided in step 110. The visual parameter set comprising a plurality of visual parameters 10 is provided in step 120. The illustrated order of steps 110 and 120 is not essential. For each sample of visual parameters 10 from the visual parameter set (or after a sampling step 11) a synthetic visual data set comprising synthetic visual data and groundtruth data is generated in step 130a according to the visual parameter set, while in step 130b an authentic visual data set comprising authentic images and groundtruth data according to the visual parameter set is sampled, i.e. captured, or selected.

In step 140a, items of the synthetic visual data set with corresponding groundtruth data are provided to the computer vision model 16 to output items of predicted groundtruth and to compute items of (synthetic) performance scores. Analogously, in step 140b items of the authentic visual data set with corresponding groundtruth data are provided to the computer vision model 16 to output items of predicted groundtruth and to compute items of (authentic) performance scores.

In step 150a a first sensitivity measure of the plurality of synthetic performance scores over the plurality of visual parameters is generated. Analogously, in step 150b, a second sensitivity measure of the plurality of authentic performance scores over the plurality of visual parameters are generated. In an optional step (not shown in FIG. 2) at least one first ranking of the plurality of visual parameters based on the first sensitivity measure can be generated elucidating the relevance of visual parameters in the synthetic branch. Analogously, in an optional step 160b (also not shown in FIG. 2) at least one second ranking of the plurality of visual parameters based on the second sensitivity measure can be generated elucidating the relevance of visual parameters in the authentic branch.

In step 160, the first and the second sensitivity measure are compared, and the conformance result can be returned based on the predetermined criterion. Optionally, the first and second rankings of the visual parameters for the synthetic and authentic visual data can be compared.

Figure 5:
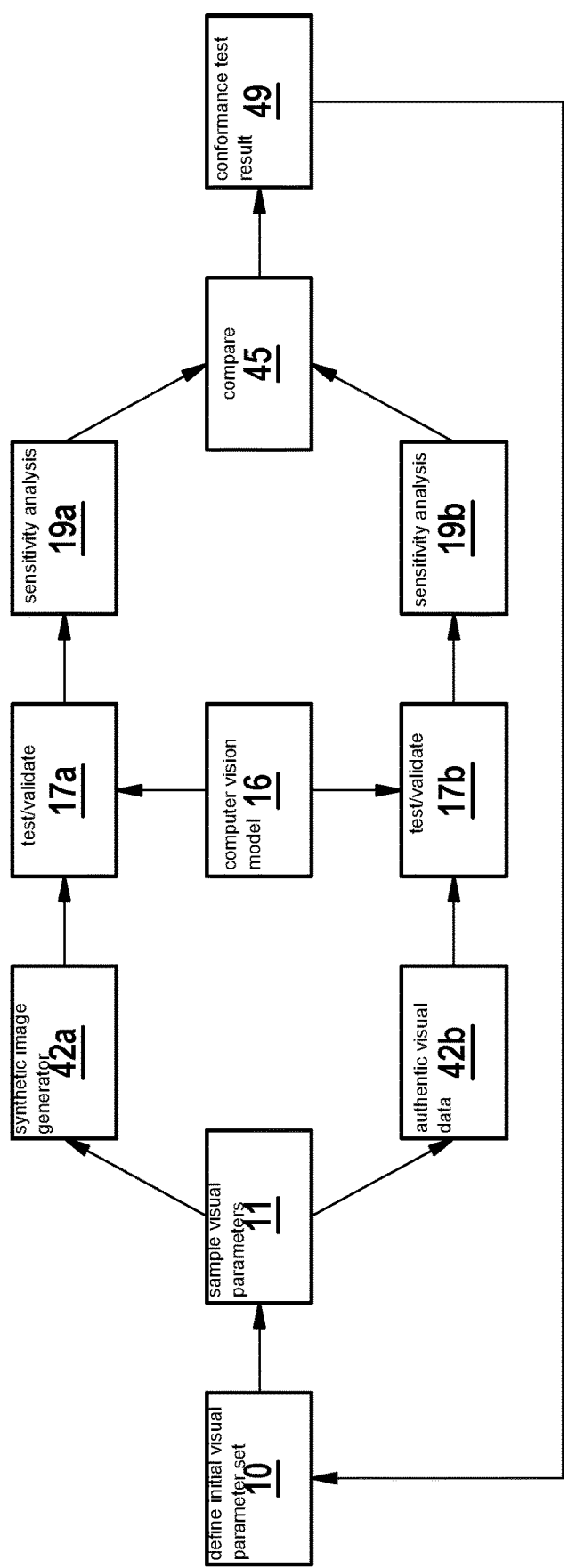
FIG. 5 schematically illustrates an example of a computer-implemented method for testing a conformance between images generated by a synthetic image generator and images obtained from real visual data, in accordance with the present invention.

FIG. 5 schematically illustrates an example of a computer-implemented method for testing a conformance between images generated by a synthetic image generator and images obtained from real visual data.

An initial visual parameter set comprising, for example, set of initial visual parameters in terms of values or value ranges is defined 10 (e.g., by experts).

A synthetic image generator 42a which is configured to generate an item of visual data and an item of corresponding groundtruth for each sample resulting from sampling 11 visual parameters according to the visual parameter set 10. For each of the aforementioned samples of visual parameters, an item of authentic visual data and an item of corresponding groundtruth is acquired 42b, i.e., captured by a physical capturing device or provided by a database.

In an embodiment, each sample of visual parameters 10 from the visual parameter set (or after a sampling step 11) associated with an item of authentic visual data is stored and subsequently provided to the sensitivity analysis 19. This addresses the problem that it might be difficult to acquire authentic visual data (for example, from experiments or a database) that has the exact value required by a corresponding sample of the visual parameters 10.

Furthermore, a pre-trained computer vision model 16 is provided. This computer vision model is used in a first testing/validation step 17a to output items of predicted groundtruth for items of synthetic visual data generated in 42a. In 17a also performance scores of the computer vision model when analysing synthetic image data are computed based on groundtruth data and predicted groundtruth data for synthetic visual data. Analogously, the computer vision model is used in a second testing/validation step 17b to output items of predicted groundtruth for items of authentic visual data acquired in 42b. Again, in 17b, performance scores of the computer vision model when analysing authentic image data are computed based on groundtruth data and predicted groundtruth data for authentic visual data.

Figure 6A:
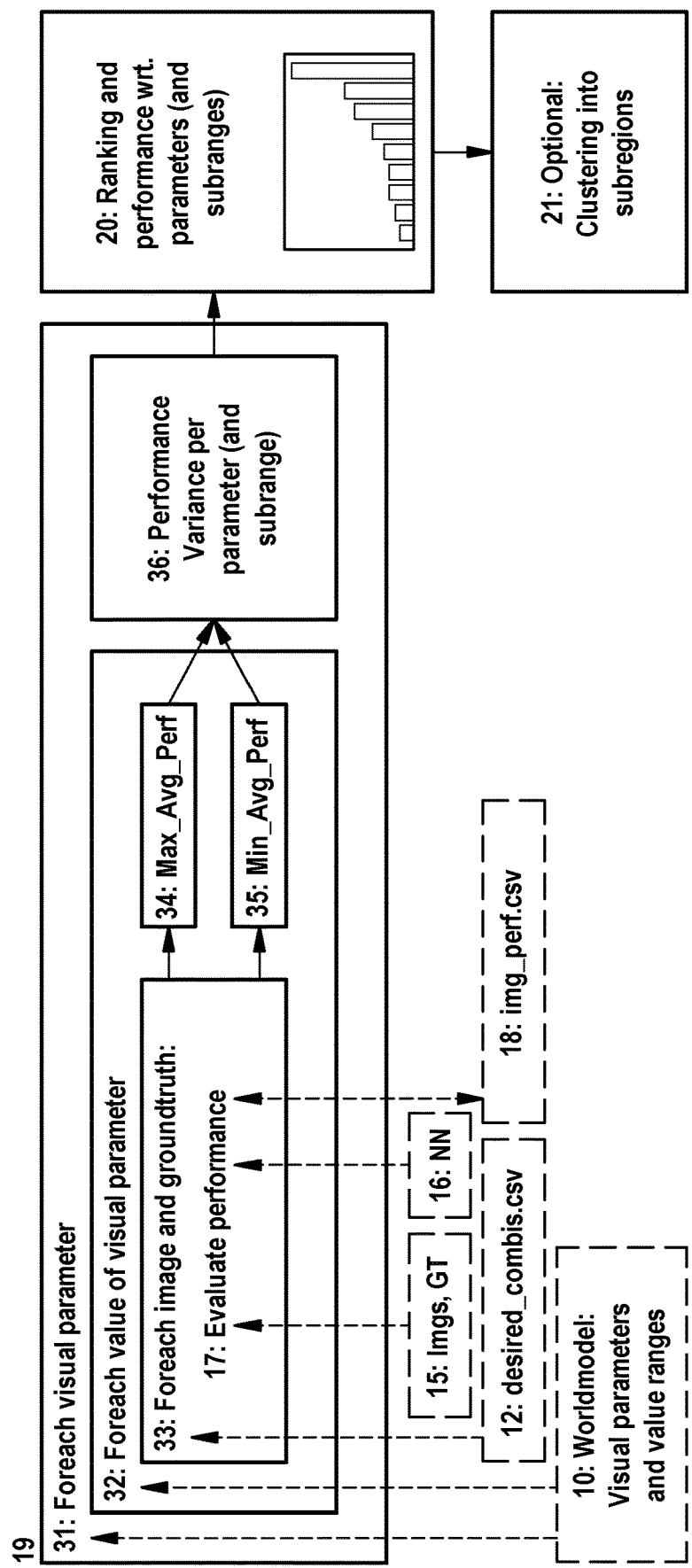
FIG. 6A schematically illustrates an example of a first implementation of a computer implemented calculation of a global sensitivity analysis of visual parameters, in accordance with an example embodiment of the present invention.

FIG. 6A schematically illustrates an example of a first implementation of a computer implemented calculation of a global sensitivity analysis of visual parameters.

Figure 6B:
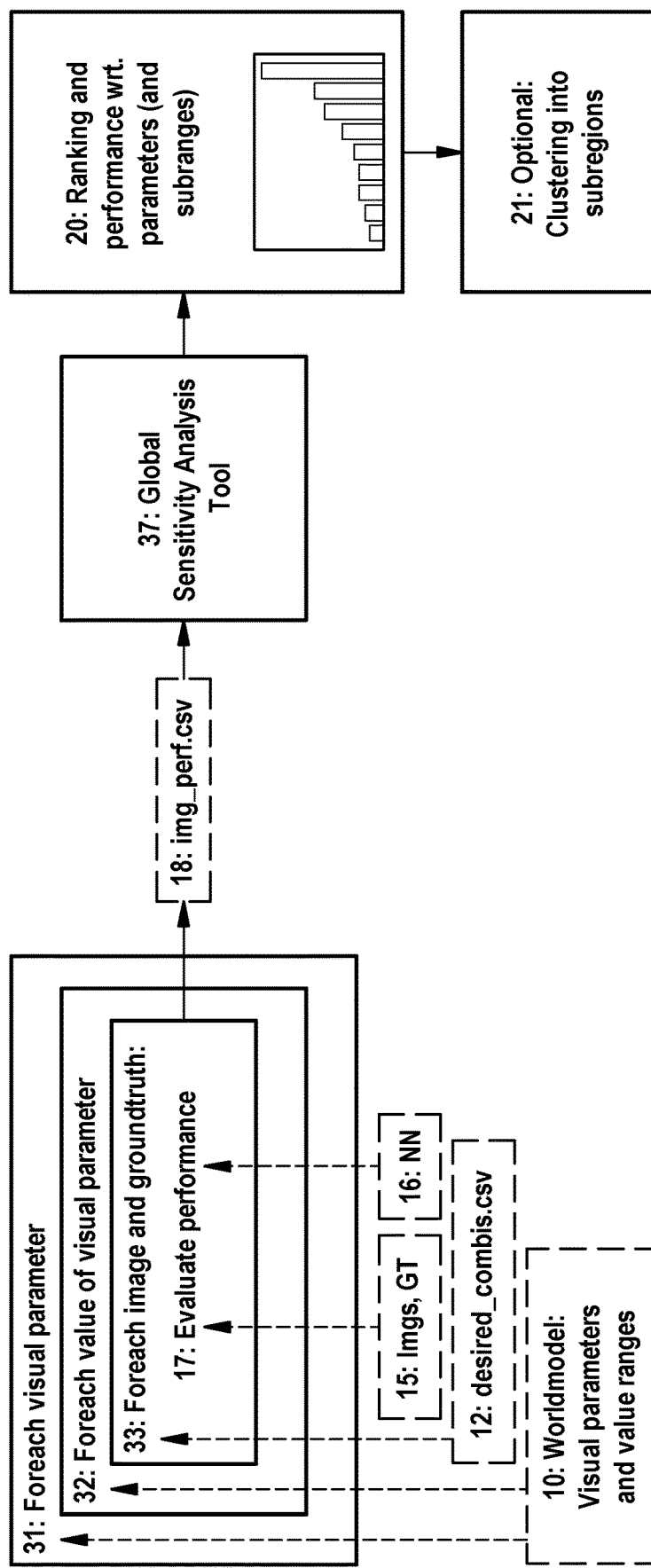
FIG. 6B schematically illustrates an example of a second implementation of a computer implemented calculation of a global sensitivity analysis of visual parameters, in accordance with an example embodiment of the present invention.

FIG. 6B schematically illustrates an example of a second implementation of a computer implemented calculation of a global sensitivity analysis of visual parameters.

As an example, a nested loop is performed for each visual parameter 31, for each value of the current visual parameter 32, for each item of visual data and corresponding item of groundtruth 33 is captured, generated, and selected for the current value of the current visual parameter an item of groundtruth is predicted by e.g. applying the second method (according to the second aspect).

In each such step, a performance score can be computed 17 based on the current item of groundtruth and the current item of predicted groundtruth. In so doing the mapping from visual parameters to performance scores can be defined e.g. in terms of a lookup-table. It is possible and often meaningful to classify, group or cluster visual parameters e.g. in terms of subranges or combinations or conditions between various values/subranges of visual parameters.

In FIG. 6A, a measure of variance of performance scores (viz. performance variance) can be computed based on arithmetic operations such as e.g. a minimum, a maximum or an average of performance scores within one class, group, or cluster.

Alternatively, in FIG. 6B a global sensitivity analysis can be performed by using a global sensitivity analysis tool 37. As an example, a ranking of performance scores and/or a ranking of variance of performance scores, both with respect to visual parameters or their class, groups or clusters can be generated and visualized. It is by this means that relevance of visual parameters can be determined, in particular irrespective of the biases of the human perception system. Also, adjustment of the visual parameters, i.e. of the operational design domain (ODD), can result from quantitative criteria.

In an embodiment, sensitivity of synthetic performance scores with respect to visual parameters in the visual parameter set is determined using a first sensitivity analysis 19a. Analogously, sensitivity of authentic performance scores with respect to visual parameters in the visual parameter set is determined using another second sensitivity analysis 19b. These sensitivity analyses 19a, 19b optionally use the same algorithm, or different algorithms. At block 45, corresponding results between the first sensitivity analysis 19a and the second sensitivity analysis 19b for at least one set of visual parameters are compared. Such comparison can advantageously comprise at least one conformance test result 49 based on a predetermined criterion, the conformance test result preferably being binary indicating "positive" or "negative" conformance.

Positive conformance indicates that synthetic visual data and corresponding groundtruth data can be used as a surrogate. For example, the output of 19a and 19b may be lists of visual parameters ordered according to sensitivity. If position of the visual parameters in lists 19a and 19b correspond, then a positive conformance result may be returned. If position of the visual parameters in lists 19a and 19b does not correspond, then a negative conformance result may be returned.

Optionally, visual parameters may be removed from the analysis to comprise an adjusted visual parameter list until a positive conformance result is returned. The adjusted visual parameter list represents, for example, a subset of the overall visual parameter set for which it is acceptable to apply the computer vision model to synthetic image data, and expect to obtain the same or a similar result to authentic image data.

In an embodiment, the adjusted visual parameter list is used to select visual parameters used to retrain, or to reconfigure, a synthetic image generator to obtain an adjusted synthetic image generator capable of generating synthetic image data for which the computer vision model provides the same, or similar performance to authentic image data.

In case of a negative conformance test result, the initial visual parameter set can be adjusted and the method according to the first aspect can be repeated. Alternatively, or in addition, the synthetic image generator 42a may be adjusted too and/or optimised.

Box 3. Example Python code for obtaining a sensitivity analysis based on the algorithm of FIG. 6A.

```
sensis = dict( )
for i, dim in enumerate(worldmodel.keys( )): #31
    dim_vals = worldmodel[dim]
    min_avg_acc = 1000000
    max_avg_acc = -min_avg_acc
```

Box 3. Example Python code for obtaining a sensitivity
analysis based on the algorithm of FIG. 6A.

```
    for val in dim_vals: #32
        imgIDs = desired_combis.loc[desired_combis[dim]==val]
        accs = [ ]
        for imgID in imgIDs.index: #33
            acc = get_acc_for_imgID(img_perf, imgID) #17
            accs.append(acc)
        avg_acc = sum(accs)/len(accs)
        min_avg_acc = min(min_avg_acc, avg_acc) #34
        max_avg_acc = max(max_avg_acc, avg_acc) #35
    sensis[dim] = max_avg_acc-min_avg_acc #36
```

Therefore, according to the first output option of the method, the algorithm of FIG. 6A, for which an example is shown in Box 3, is applied one to the authentic image data, and once to the synthetic image data. The result is two ordered lists of sensitivity to the set of visual parameters of the world model—one representing the sensitivity result of visual parameters to the authentic image data, and the other ranking representing the sensitivity result of visual parameters to of the synthetic image data.

FIG. 6B schematically illustrates an example of an alternative implementation of a computer implemented calculation of a global sensitivity analysis of visual parameters, in which a global sensitivity analysis software engine 37 receives the performance score of each pair of images in the world model.

Figure 7A:
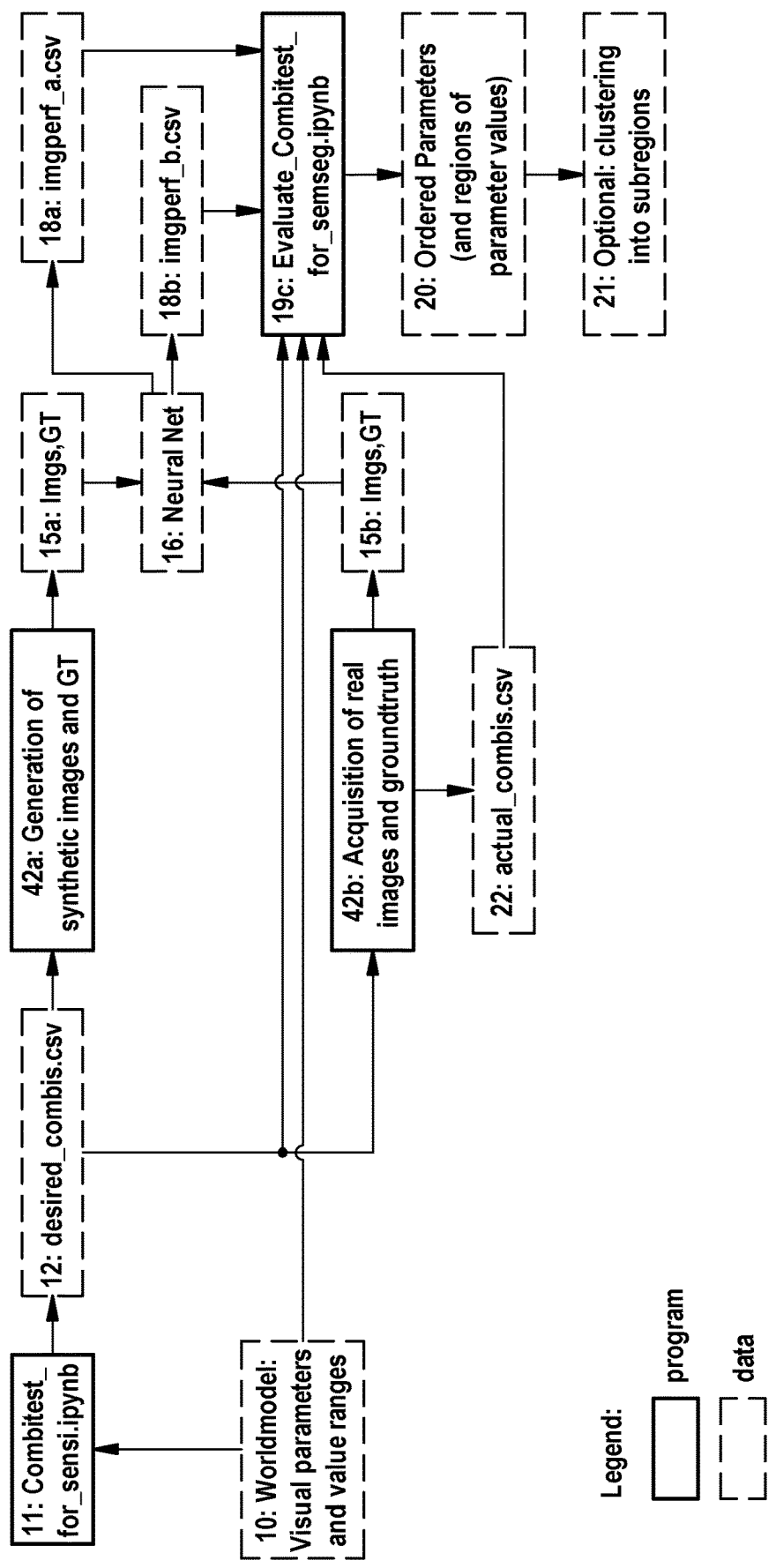
FIG. 7A schematically illustrates a flow diagram of an alternative method for testing a conformance between images generated by a synthetic image generator and images obtained from real visual data based on calculating a performance score as a performance delta between a plurality of visual parameter combinations, in accordance with an example embodiment of the present invention.

FIG. 7A schematically illustrates a flow diagram of an alternative method for testing a conformance between images generated by a synthetic image generator and images obtained from real visual data based on calculating a performance score as a performance delta between a plurality of visual parameter combinations.

In the embodiment of FIG. 7A, the functionality of boxes 10, 11, 12, 42a, 42b and 16 is as described previously. However, the performance score of the authentic image data 18a and the performance score of the synthetic image data 18b is evaluated by the alternative sensitivity analysis function 19c. The alternative sensitivity analysis function 19c is further explained in FIG. 7B. The output of the alternative sensitivity analysis function 19c is an ordered list 20 of visual parameters from the world model. Optionally, a clustering 21 of the ordered list 20 of visual parameters from the world model is performed.

Figure 7B:
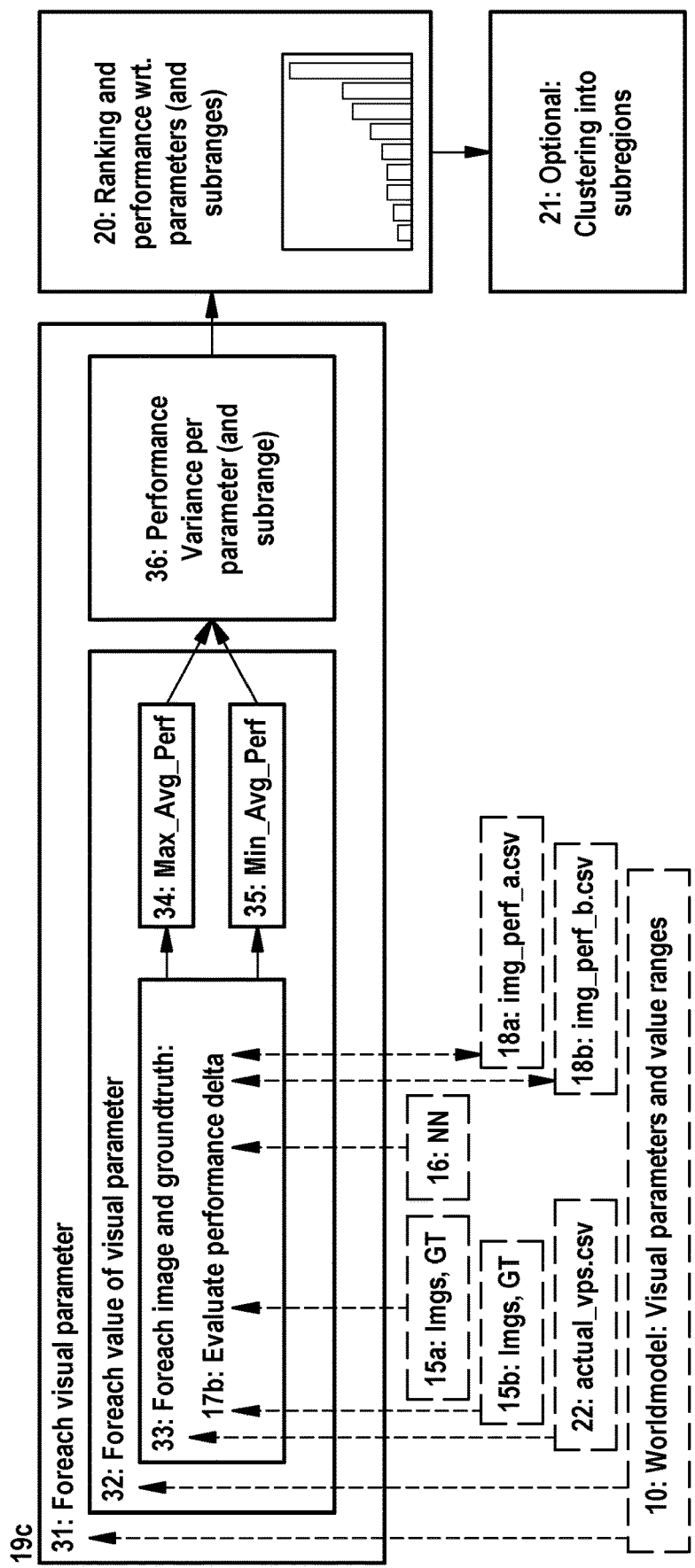
FIG. 7B schematically illustrates an example of a computer implemented calculation of a global sensitivity analysis of visual parameters based on calculating a performance score as a performance delta between a plurality of visual parameter combinations, in accordance with the present invention.

FIG. 7B schematically illustrates an example of a computer implemented calculation of a global sensitivity analysis 19c of visual parameters based on calculating a performance score as a performance delta between a plurality of visual parameter combinations.

Box 4. Python pseudocode of the generation of a conformance
result based on performance differences between the
predicted synthetic and authentic visual data.

```
sensis = dict( )
for i, dim in enumerate(worldmodel.keys( )): #31
    dim_vals = worldmodel[dim]
    min_avg_acc = 1000000
    max_avg_acc = -min_avg_acc
    for val in dim_vals: #32
        imgIDs = desired_combis.loc[desired_combis[dim]==val]
        accs = [ ]
        for imgID in imgIDs.index: #33
            acc_a = get_acc_for_imgID(img_perf_a, imgID) #17a
            acc_b = get_acc_for_imgID(img_perf_b, imgID) #17b
            s_factor = similarity(desired_combis, actual_vps,
```

Box 4. Python pseudocode of the generation of a conformance
result based on performance differences between the
predicted synthetic and authentic visual data.

```
            imgIDs)#17b
            acc_delta = difference(acc_a, acc_b) * s_factor
#17b
            accs.append(acc_delta)
        avg_acc = sum(accs)/len(accs)
        min_avg_acc = min(min_avg_acc, avg_acc) #34
        max_avg_acc = max(max_avg_acc, avg_acc) #35
    sensis[dim] = max_avg_acc-min_avg_acc #36
```

In this embodiment, the evaluation of the difference between predicted synthetic and authentic visual data occurs on a per-image pair basis in the inner loop of the sensitivity analysis algorithm 19c, resulting in a single ranked list describing the performance of visual parameters.

In an embodiment, generating the combined sensitivity measure according to the method 100 of the first aspect further comprises:

computing a plurality of similarity values between corresponding pairs of items of synthetic visual data and authentic visual data over the plurality of visual parameters of the visual parameter set;

computing a plurality of difference values between a plurality of pairs of synthetic and authentic performance scores, wherein the pairs of synthetic and authentic performance scores have a common visual parameter value in the visual parameter set;

computing, for each visual parameter in the visual parameter set, a performance difference using the plurality of similarity values and the corresponding plurality of difference values; and performing a sensitivity analysis over the plurality of visual parameters of the visual parameter set using the performance differences.

The algorithm will be described in more detail with common reference numerals referring to Figures of the application.

Therefore, an authentic and synthetic image is obtained for each visual parameter value. In detail: a set of initial visual parameters 10 and values or value ranges for the parameters are defined (e.g., by experts). A synthetic image generator which generates input images (or image sequences) and groundtruth 42b according to the visual parameters 10 is obtained. A data set, or a physical capturing setup, or data provider 42b to obtain real images (or image sequences) with groundtruth is arranged. A computer vision function 16 is obtained.

Based on the visual parameters, value assignments to parameters are performed 11, In an example, these may be provided by combinatorial testing (i.e., t-wise testing) or hypercube sampling. An implementation that uses combinatorial testing is shown in 11.

Based on the samples 11, images and groundtruth are synthesized 42a.

Based on the samples 11, real images and groundtruth 42b are obtained (captured or selected from a database). The real images may not perfectly match the desired combinations from 11, therefore the actual visual parameters 22 obtained in 42b are stored provided to the analysis 19. In step 17, the computer vision function 16 is tested with data from 42a and with data from 42b, separately with each data set.

A combined sensitivity analysis between the authentic and synthetic data is then performed. For example:

A difference between the performance scores of the corresponding predictions (from 16) vs. groundtruth and corresponding metrics is computed. Corresponding means the evaluations of (16) with respect to inputs from 42a and 42b, respectively. Different formulas may be used the measure the difference such a L-norms and other metrics.

The similarity between the input images is computed. For this the desired_combis.csv and actual_vps.csv can be compared. The similarity is optionally defined in the range [0 . . . 1] such that the similarity factor is 1.0 if the images are identical (or if the parameters are identical) closer to 0 if the images or their parameters differ. This input similarity is multiplied with the differences.

The delta performance for each visual parameter combination is computed.

A global sensitivity analysis 19c is applied on the parameters 10 given the delta performance results (scores) per-image on a selected performance metric from 17. The analysis analyses the variance of the performance scores with respect to each visual parameter 10 of the visual parameter set and creates a ranking. The value intervals of visual parameters can be partitioned into subintervals and the subintervals can be treated as new dimensions (new visual parameters).

Given the sensitivity analysis result 45, the visual parameters 10 are updated. For example, irrelevant parameters are removed, more tests are dedicated to important parameters, new parameters are added, the implementation of parameters is changed 42.

The foregoing process is optionally repeated until experts or an automated criterion of the analysis is met.

If the conformance test result 49 is positive (with respect to a subset of visual parameters 10 then inform a user may be informed via an output interface, that the synthetic data generated by 42a can be used as a surrogate for 42b when testing 16 with respect to the subset of visual parameters 42a is validated. If the test result is a numeric score 49, then inform output may be provided about the score in order to enable a decision as to whether 42a can be used for testing the computer vision model.

Further options relevant to the first aspect will now be discussed.

In an embodiment, the computer-implemented method 100 further comprises generating first and second rankings of the plurality of visual parameters of the visual parameter set for the synthetic, and authentic visual data based on the corresponding first and second sensitivity measures. In other words, such a ranking may display a sorting of variances of performance scores with respect to visual parameters or subsets, clusters, and/or combinations thereof. Comparing the first and second sensitivity measures may then comprise comparing the first and second rankings of the visual parameters for the corresponding synthetic, and authentic visual data.

In an embodiment, the computer-implemented method 100 for testing a conformance between images generated by a synthetic image generator and images obtained from authentic visual data comprises obtaining a computer vision model in an initial training state configured to perform a computer vision model for characterising elements of scenes in observed visual data or synthetic visual data.

The method in this embodiment further comprises obtaining a visual parameter set comprising a plurality of visual parameters, wherein at least one visual parameter is capable of affecting a classification or regression performance of the computer vision model.

The method in this embodiment further comprises generating a synthetic visual data set compliant with the visual parameter set comprising a plurality of items of synthetic visual data and a corresponding plurality of items of synthetic groundtruth data.

The method in this embodiment further comprises obtaining from an authentic visual data set sampled based on the visual parameter set, a plurality of items of authentic visual data and a corresponding plurality of items of authentic groundtruth data.

The method in this embodiment further comprises performing a first evaluation of the plurality of items of synthetic visual data using the computer vision model, and comparing a first plurality of results therefrom with the corresponding plurality of items of synthetic groundtruth data, to obtain a first series of performance scores.

The method in this embodiment further comprises performing a second evaluation of the plurality of items of authentic visual data using the computer vision model, and comparing a second plurality of results therefrom with the corresponding plurality of items of authentic groundtruth data, to obtain a second series of performance scores.

The method in this embodiment further comprises performing a first sensitivity analysis of the first series of performance scores with respect to corresponding visual parameters of the plurality of items of synthetic visual data, and performing a second sensitivity analysis of the second series of performance scores with respect to the corresponding visual parameters of the plurality of items of authentic visual data.

The method in this embodiment further comprises generating a first ranking of the visual parameters of the plurality of items of synthetic visual data and a second ranking of the visual parameters of the plurality of items of authentic visual data.

The method in this embodiment further comprises, if the first ranking of visual parameters and the second ranking of visual parameters are sufficiently close in terms of a predetermined criterion, returning a positive conformance result of the synthetic image generator.

In an embodiment, for each item in the training and/or validation data set, a performance score can be computed based on a comparison between the prediction of one or more elements within the observed scenes, and the corresponding item of groundtruth data. In particular, the plurality of synthetic and authentic performance scores comprises, or depends on, any one or any combination of a confusion matrix, precision, recall, F1 score, intersection of union, or mean average.

In an embodiment, the method according to the first aspect comprises displaying, via an output interface, the first and second sensitivity measures and the conformance result in a graphical user interface, which optionally also comprises a display of the first and second rankings of the plurality of visual parameters of the visual parameter set for the synthetic, and/or the authentic visual data. Such graphical output is advantageous as it enables an expert to adjust the visual parameter set, i.e. the operational design domain (ODD).

In an embodiment, the computer vision model is a neural or a neural-like network, optionally a deep neural network and/or a convolutional neural network. A neural-like network can be e.g. a composition of a given number of functions, wherein at least one function is a neural network, a deep neural network, or a convolutional neural network.

In an embodiment, the performance scores are calculated using at least one classification label and/or at least one regression value obtained from the synthetic and/or authentic visual data and their corresponding groundtruth.

The computer vision model 16 may be configured to output at least one classification label and/or at least one regression value of at least one element comprised in a scene contained in at least one item of visual data. A classification label can for example refer to object detection, in particular to events like "obstacle/no obstacle in front of a vehicle".

A regression value can for example be a speed suggestion in response to road conditions, traffic signs, weather conditions etc.

As an example, a combination of at least one classification label and at least one regression value would be outputting both a speed limit detection and a speed suggestion. When applying the computer vision model 16 (feed-forward), such output relates to a predicted item of groundtruth data. During training such output of the computer vision model 16 relates to the groundtruth GT data in the sense that on a training data set predicted items of groundtruth data (from feed-forward) shall be as close as possible to items of (true) groundtruth data, at least statistically.

In an embodiment, value ranges for at least one of the plurality of visual parameters of the visual parameter set are partitioned into a plurality of subintervals based on the analysis of the sensitivity of the plurality of synthetic and authentic performance scores, wherein the plurality of subintervals are treated as new dimensions of the plurality of visual parameters, optionally based on the first and second ranking of visual parameters. As an example, a value range for a visual parameter can be split into subintervals. Each such subinterval can be promoted to a new dimension with binary values indicating whether or not the visual parameter lies in the subinterval. Such can be advantageous, if it emerges, as a result of the sensitivity analysis, that performance behaviour is very different from one subinterval to another.

In an embodiment, the method according to the first aspect comprises returning a positive conformance result based on the predetermined criterion if (i) the rankings of the plurality of visual parameters of the synthetic, and authentic visual data have identical order; and/or (i) a measure between the rankings of the plurality of visual parameters of the synthetic, and authentic visual data is below a predetermined threshold, wherein optionally the measure comprises or depends on differences between variances and/or averaging/taking a maximum on differences between variances.

In an embodiment, the method according to the first aspect comprises removing one or more visual parameters from the visual parameter set, or adding one or more visual parameters to the visual parameter set to form an amended visual parameter set. The method according to the first aspect further comprises analysing the sensitivity of the plurality of synthetic and authentic performance scores over the plurality of visual parameters of the amended visual parameter set. The method according to the first aspect further may comprise generating updated rankings of the plurality of visual parameters of the amended visual parameter set for the synthetic, and authentic visual data.

In an example, the first and second rankings can be deemed to agree (positive conformance) if the order of parameters of both rankings is the same. If the order is not the same, then visual parameters are removed from both rankings, until the order is the same.

Alternatively, or in addition, a measure between the first and the second ranking can be computed. For example, differences or some other measure between variances of performance scores of each corresponding tuples of both rankings can be computed, with each of the tuples consisting of a visual parameter and a variance of performance. Subsequently, an overall comparison score can be computed, for instance, in terms of an average or a maximum of differences. The overall comparison score can be used as a conformance test result 49. Visual parameters can be removed in order to improve the overall comparison score. The comparison score can also be tested against a target threshold to either output a positive or negative conformance test result.

The method according to the first aspect further comprises comparing the updated rankings of the visual parameters (and/or other measures of sensitivity or performance) for the synthetic, and authentic visual data, and returning a further conformance result based on a further predetermined criterion.

In an embodiment, the predetermined criterion is calculated at least by performing a rank correlation test between the ranking of the plurality of visual parameters of the synthetic data and the plurality of visual parameters of the authentic visual data, wherein the rank correlation test is optionally one of Kendall's Tau, Spearman's Rho, Somers' D, or Goodman and Kruskal's Gamma.

As another example, two rankings can be compared in adding differences, absolute differences, or squared differences of variance of performance scores between the two rankings for each visual parameter or combination. The predetermined criterion can then be given in terms of a further predetermined threshold value.

In an embodiment, the visual parameters may comprise one or any combination selected from the following list:
  one or more parameters describing a configuration of an image capture arrangement, optionally an image or video capturing device, visual data is taken in or synthetically generated for, optionally, spatial and/or temporal sampling, distortion aberration, colour depth, saturation, noise, absorption, reflectivity of surfaces;
  one or more light conditions in a scene of an image/video, light bounces, reflections, light sources, fog and light scattering, overall illumination; and/or
  one or more features of the scene of an image/video, optionally, one or more objects and/or their position, size, rotation, geometry, materials, textures;
  one or more parameters of an environment of the image/video capturing device or for a simulative capturing device of a synthetic image generator, optionally, environmental characteristics, seeing distance, precipitation characteristics, radiation intensity; and/or
  image characteristics, optionally, contrast, saturation, noise;
  one or more domain-specific descriptions of the scene of an image/video, optionally, one or more cars or road users, or one or more objects on a crossing.

According to the second aspect, a computer-implemented method for producing safety-enhanced computer vision based on a computer vision model is provided. Safety-enhancement can result from being able to reliably (i.e. after positive conformance) generate as many items of visual data and items of corresponding groundtruth as are needed for training and/or validating the computer vision model.

Developing comprises design decisions such as defining or adjusting the (initial) operational design domain. Testing comprises validation and/or verification of the computer vision model 16. Producing comprises training the computer vision model 16, and/or integrating it into a computer or embedded system.

The computer-implemented method for producing a synthetic image generator tested using a computer vision model according to the second aspect comprises:

testing conformance of a synthetic image generator according to the computer-implemented method of the first aspect;

if the conformance result is negative, adjusting the synthetic image generator and/or amending one or more of the plurality of visual parameters (ODD) of the visual parameter set, and repeating the previous testing step, until the conformance result is positive; and outputting the adjusted synthetic image generator.

The computer-implemented method according to the second aspect further comprises:

obtaining a set of training data using the adjusted synthetic image generator, wherein the synthetic image generator is configured using the amended one or more of the plurality of visual parameters (ODD) of the visual parameter set; and either: (1) outputting the set of synthetic training data, or (2) training a further computer vision model from an initial training state based on the set of synthetic training data; and subsequently outputting the computer vision model.

Figure 3:
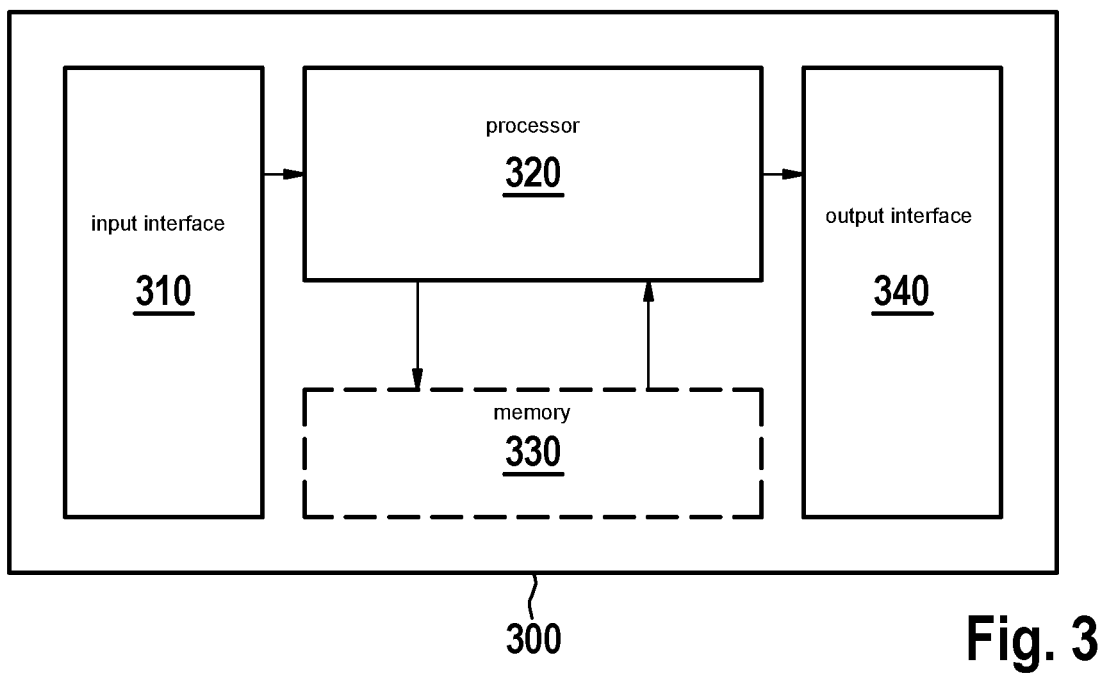
FIG. 3 schematically illustrates a data processing apparatus according to the third aspect, in accordance with an example embodiment of the present invention.

The method according to the second aspect is advantageously used to ensure that synthetic training data the computer vision model is trained on is a valid surrogate for authentic training data. A data processing apparatus 300 according to the third aspect is schematically illustrated in FIG. 3.

A third aspect relates to an apparatus 300 for testing a conformance between images generated by a synthetic image generator and images obtained from authentic visual data, comprising an input interface 310, a processor 320, a memory 330, and an output interface 340.

The input interface 310 is configured to obtain a computer vision model in an initial training state configured to perform a computer vision function, and to obtain a visual parameter set comprising a plurality of visual parameters.

The processor 320 is configured to generate a synthetic visual data set comprising synthetic visual data and groundtruth data according to the visual parameter set, and to sample an authentic visual data set comprising authentic images and groundtruth data according to the visual parameter set.

The processor 320 is configured to apply the computer vision model to the synthetic visual data set and the authentic visual data set, to thus obtain a predicted synthetic visual data set and a predicted authentic visual data set, and to generate a plurality of synthetic and authentic performance scores over the plurality of visual parameters of the visual parameter set, wherein each performance score is a comparison of an item of predicted synthetic visual data or predicted authentic visual data with a corresponding item of groundtruth data.

The processor 320 is configured to generate a first sensitivity measure of the plurality of synthetic performance scores over the plurality of visual parameters, and to generate a second sensitivity measure of the plurality of authentic performance scores over the plurality of visual parameters, or to generate a combined sensitivity measure based on a difference between corresponding synthetic and authentic performance scores over the plurality of visual parameters.

The processor 320 is configured to generate a conformance result defining the conformance between images generated by the synthetic image generator and images obtained from the authentic visual data at the same or similar visual parameter of the visual parameter set by (1) comparing the first sensitivity measure and the second sensitivity measure, or (2) generating the conformance result based on the combined sensitivity measure.

In an embodiment, the output interface 340 is configured to output the conformance result.

A fourth aspect relates to a computer program 350 comprising machine-readable instructions which, when executed by a processor, is capable of carrying out either (i) the computer-implemented method of the first aspect, and/or (ii) the computer-implemented method of the second aspect.

The memory 330 of the apparatus 300 stores a computer program 350 according to the fourth aspect that, when executed by the processor 320, causes the processor 320 to execute the functionalities described by the computer-implemented methods according to the first and second aspects. According to an example, the input interface 310 and/or output interface 340 is one of a USB interface, an Ethernet interface, a WLAN interface, or other suitable hardware capable of enabling the input and output of data samples from the apparatus 300.

In an example, the apparatus 300 further comprises a volatile and/or non-volatile memory system 330 configured to receive input observations as input data from the input interface 310.

Figure 4:
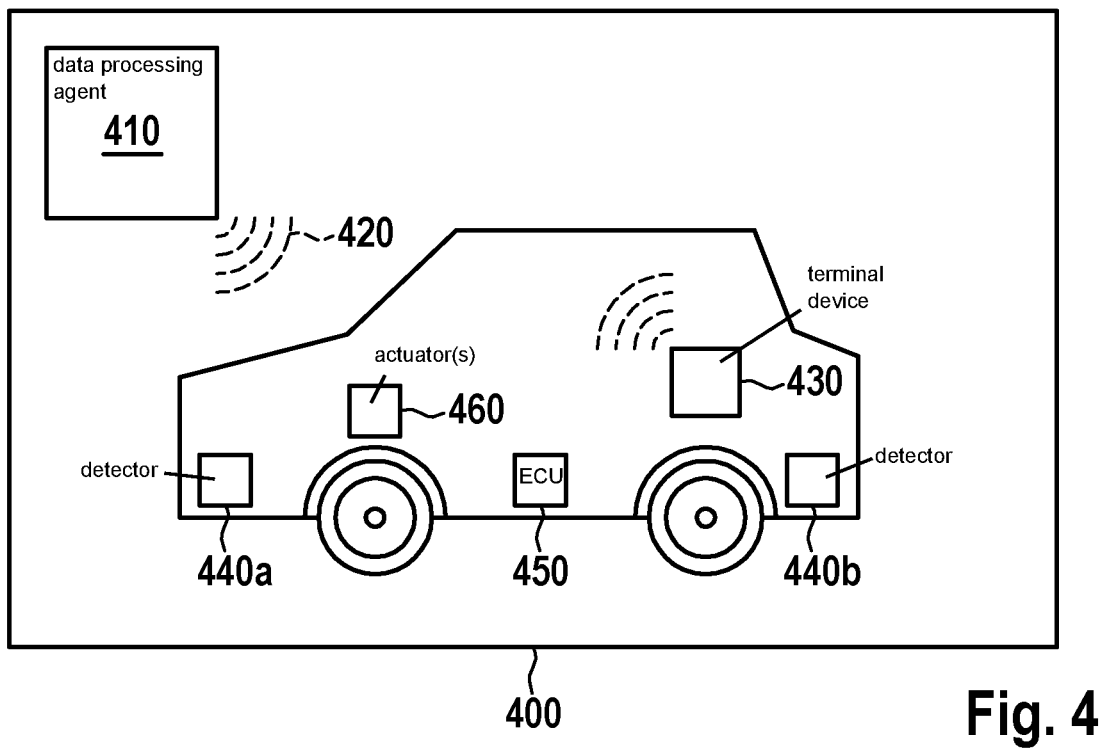
FIG. 4 schematically illustrates a distributed data communications system, in accordance with an example embodiment of the present invention.

In an example, the apparatus 300 is an automotive embedded computer comprised in a vehicle as in FIG. 4, in which case the automotive embedded computer may be connected to sensors 440a, 440b and actuators 460 present in the vehicle. For example, the input interface 310 of the apparatus 300 may interface with one or more of an engine control unit ECU 450 providing velocity, fuel consumption data, battery data, location data and the like. For example, the output interface 340 of the apparatus 300 may interface with one or more of a plurality of brake actuators, throttle actuators, fuel mixture or fuel air mixture actuators, a turbocharger controller, a battery management system, the car lighting system or entertainment system, and the like.

A fifth aspect relates to a computer readable medium 370 comprising one or both of the computer programs 350.

An aspect relates to a distributed data communications system 400 comprising a data processing agent 410, a communications network and a terminal device 430, wherein the terminal device is optionally comprised within an automobile or robot.

The data processing agent 410 is configured to transmit the computer vision model 16 trained according to the method of the second aspect to the terminal device via the communications network.

In other words, a computer vision model is trained at a remote facility according to the first aspect, and is transmitted to the vehicle such as an autonomous vehicle, semi-autonomous vehicle, automobile, or robot via a communications network as a software update to the vehicle, automobile or robot.

The examples provided in the figures and described in the foregoing written description are intended for providing an understanding of main features of the present invention. No limitation to the scope of the present invention is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method for testing a conformance between images generated by a synthetic image generator and images obtained from authentic visual data, comprising the following steps:
    obtaining a computer vision model in an initial training state configured to perform a computer vision function;
    obtaining a visual parameter set including a plurality of visual parameters;
    generating a synthetic visual data set including synthetic visual data and corresponding groundtruth data according to the visual parameter set, and sampling an authentic visual data set including authentic images and corresponding groundtruth data according to the visual parameter set;
    applying the computer vision model to the synthetic visual data set and the authentic visual data set, to obtain a predicted synthetic visual data set and a predicted authentic visual data set, respectively, and generating a plurality of synthetic and authentic performance scores over the plurality of visual parameters of the visual parameter set, wherein each of the plurality of synthetic and authentic performance scores is a comparison of an item of predicted synthetic visual data or predicted authentic visual data with a corresponding item of groundtruth data;
    (i) generating a first sensitivity measure of the plurality of synthetic performance scores over the plurality of visual parameters, and generating a second sensitivity measure of the plurality of authentic performance scores over the plurality of visual parameters, or (ii) generating a combined sensitivity measure based on a difference between corresponding synthetic and authentic performance scores over the plurality of visual parameters; and
    generating a conformance result defining the conformance between images generated by the synthetic image generator and images obtained from the authentic visual data at a same or similar visual parameter of the visual parameter set by (i) comparing the first sensitivity measure and the second sensitivity measure, or (ii) generating the conformance result based on the combined sensitivity measure.

2. The computer-implemented method according to claim 1, further comprising:
    generating first and second rankings of the plurality of visual parameters of the visual parameter set for the synthetic, and authentic visual data based on the corresponding first and second sensitivity measures;
    wherein the comparing of the first and second sensitivity measures includes comparing the first and second rankings of the visual parameters for the corresponding synthetic, and authentic visual data.

3. The computer-implemented method according to claim 2, further comprising:
    displaying, via an output interface, the first and second sensitivity measures and the conformance result in a graphical user interface, wherein the displaying also includes a display of the first and second rankings of the plurality of visual parameters of the visual parameter set for the synthetic, and/or the authentic visual data.

4. The computer-implemented method according to claim 2, further comprising:
    returning a positive conformance result based on predetermined criterion when (i) the first and second rankings of the plurality of visual parameters of the synthetic, and authentic visual data have identical order; and/or (ii) a measure between the first and second rankings of the plurality of visual parameters of the synthetic, and authentic visual data is below a predetermined threshold.

5. The computer-implemented method according to claim 4, wherein the measure includes or depends on differences between variances and/or averaging/taking a maximum on differences between variances.

6. The computer-implemented method according to claim 4, further comprising:
    removing one or more visual parameters from the visual parameter set, or adding one or more visual parameters to the visual parameter set to form an amended visual parameter set;
    analysing a sensitivity of the plurality of synthetic and authentic performance scores over the plurality of visual parameters of the amended visual parameter set;
    generating updated rankings of the plurality of visual parameters of the amended visual parameter set for the synthetic, and authentic visual data; and
    comparing the updated rankings of the visual parameters for the synthetic, and authentic visual data, and returning a further conformance result based on a further predetermined criterion.

7. The computer-implemented method according to claim 6, wherein the predetermined criterion is calculated at least by:
    performing a rank correlation test between the first and second rankings of the plurality of visual parameters of the synthetic data and the plurality of visual parameters of the authentic visual data.

8. The computer-implemented method according to claim 7, wherein the rank correlation test is optionally one of Kendall's Tau, or Spearman's Rho, or Somers' D, or Goodman and Kruskal's Gamma.

9. The computer-implemented method according to claim 1, wherein the plurality of synthetic and authentic performance scores include, or depends on, any one or any combination of a confusion matrix, or precision, or recall, or F1 score, or intersection of union, or mean average.

10. The computer-implemented method according to claim 1, further comprising:
    displaying, via an output interface, the first and second sensitivity measures and the conformance result in a graphical user interface.

11. The computer-implemented method according to claim 1, wherein the computer vision model is a neural or a neural-like network, including a deep neural network and/or a convolutional neural network.

12. The computer-implemented method according to claim 1, wherein the synthetic and authentic performance scores are calculated using at least one classification label and/or at least one regression value obtained from the synthetic and/or authentic visual data and their corresponding groundtruth.

13. The computer-implemented method according to claim 1, wherein value ranges for at least one of the plurality of visual parameters of the visual parameter set are partitioned into a plurality of subintervals based on an analysis of the sensitivity of the plurality of synthetic and authentic performance scores, wherein the plurality of subintervals are treated as new dimensions of the plurality of visual parameters.

14. The computer-implemented method according to claim 13, wherein the plurality of subintervals are treated as new dimensions to the plurality of visual parameters based on the first and second rankings of visual parameters.

15. The computer-implemented method according to claim 1, wherein generating the combined sensitivity measure further includes:
  computing a plurality of similarity values between corresponding pairs of items of synthetic visual data and authentic visual data over the plurality of visual parameters of the visual parameter set;
  computing a plurality of difference values between a plurality of pairs of synthetic and authentic performance scores, wherein the pairs of synthetic and authentic performance scores have a common visual parameter value in the visual parameter set;
  computing, for each visual parameter in the visual parameter set, a performance difference using the plurality of similarity values and the corresponding plurality of difference values; and
  performing a sensitivity analysis over the plurality of visual parameters of the visual parameter set using the performance differences.

16. A computer-implemented method for producing a synthetic image generator tested using a computer vision model, comprising the following steps:
  testing conformance of the synthetic image generator between images generated by a synthetic image generator and images obtained from authentic visual data, the testing including:
    obtaining a computer vision model in an initial training state configured to perform a computer vision function,
    obtaining a visual parameter set including a plurality of visual parameters,
    generating a synthetic visual data set including synthetic visual data and corresponding groundtruth data according to the visual parameter set, and sampling an authentic visual data set including authentic images and corresponding groundtruth data according to the visual parameter set;
    applying the computer vision model to the synthetic visual data set and the authentic visual data set, to obtain a predicted synthetic visual data set and a predicted authentic visual data set, respectively, and generating a plurality of synthetic and authentic performance scores over the plurality of visual parameters of the visual parameter set, wherein each of the plurality of synthetic and authentic performance scores is a comparison of an item of predicted synthetic visual data or predicted authentic visual data with a corresponding item of groundtruth data,
    (i) generating a first sensitivity measure of the plurality of synthetic performance scores over the plurality of visual parameters, and generating a second sensitivity measure of the plurality of authentic performance scores over the plurality of visual parameters, or (ii) generating a combined sensitivity measure based on a difference between corresponding synthetic and authentic performance scores over the plurality of visual parameters, and
    generating a conformance result defining the conformance between images generated by the synthetic image generator and images obtained from the authentic visual data at a same or similar visual parameter of the visual parameter set by (i) comparing the first sensitivity measure and the second sensitivity measure, or (ii) generating the conformance result based on the combined sensitivity measure;
  based on the conformance result being negative, adjusting the synthetic image generator and/or amending one or more of the plurality of visual parameters of the visual parameter set, and repeating the testing step, until the conformance result is positive; and
  outputting the adjusted synthetic image generator.

17. The computer-implemented method according to claim 16, further comprising:
  obtaining a set of training data using the adjusted synthetic image generator;
  wherein the synthetic image generator is configured using the amended one or more of the plurality of visual parameters of the visual parameter set; and either: (i) outputting the set of synthetic training data, or (ii) training a further computer vision model from an initial training state based on the set of synthetic training data; and subsequently outputting the computer vision model.

18. An apparatus for testing a conformance between images generated by a synthetic image generator and images obtained from authentic visual data, comprising:
  an input interface;
  a processor;
  a memory; and
  an output interface;
  wherein the input interface is configured to obtain a computer vision model in an initial training state configured to perform a computer vision function, and to obtain a visual parameter set comprising a plurality of visual parameters;
  wherein the processor is configured to generate a synthetic visual data set including synthetic visual data and corresponding groundtruth data according to the visual parameter set, and to sample an authentic visual data set comprising authentic images and corresponding groundtruth data according to the visual parameter set;
  wherein the processor is configured to apply the computer vision model to the synthetic visual data set and the authentic visual data set, to obtain a predicted synthetic visual data set and a predicted authentic visual data set, respectively, and to generate a plurality of synthetic and authentic performance scores over the plurality of visual parameters of the visual parameter set, wherein each of the synthetic and authentic performance scores is a comparison of an item of predicted synthetic visual data or predicted authentic visual data with a corresponding item of groundtruth data;
  wherein the processor is configured: to (i) generate a first sensitivity measure of the plurality of synthetic performance scores over the plurality of visual parameters, and to generate a second sensitivity measure of the plurality of authentic performance scores over the plurality of visual parameters, or (ii) generate a combined sensitivity measure based on a difference between corresponding synthetic and authentic performance scores over the plurality of visual parameters; and
  wherein the processor is configured to generate a conformance result defining the conformance between images generated by the synthetic image generator and images obtained from the authentic visual data at the same or similar visual parameter of the visual parameter set by (i) comparing the first sensitivity measure and the second sensitivity measure, or (ii) generating the conformance result based on the combined sensitivity measure.

19. A non-transitory computer readable medium on which is stored a computer program for testing a conformance between images generated by a synthetic image generator and images obtained from authentic visual data, the computer program, when executed by a processor, causing the processor to perform the following steps:

obtaining a computer vision model in an initial training state configured to perform a computer vision function;

obtaining a visual parameter set including a plurality of visual parameters;

generating a synthetic visual data set including synthetic visual data and corresponding groundtruth data according to the visual parameter set, and sampling an authentic visual data set including authentic images and corresponding groundtruth data according to the visual parameter set;

applying the computer vision model to the synthetic visual data set and the authentic visual data set, to obtain a predicted synthetic visual data set and a predicted authentic visual data set, respectively, and generating a plurality of synthetic and authentic performance scores over the plurality of visual parameters of the visual parameter set, wherein each of the plurality of synthetic and authentic performance scores is a comparison of an item of predicted synthetic visual data or predicted authentic visual data with a corresponding item of groundtruth data;

(i) generating a first sensitivity measure of the plurality of synthetic performance scores over the plurality of visual parameters, and generating a second sensitivity measure of the plurality of authentic performance scores over the plurality of visual parameters, or (ii) generating a combined sensitivity measure based on a difference between corresponding synthetic and authentic performance scores over the plurality of visual parameters; and generating a conformance result defining the conformance between images generated by the synthetic image generator and images obtained from the authentic visual data at a same or similar visual parameter of the visual parameter set by (i) comparing the first sensitivity measure and the second sensitivity measure, or (ii) generating the conformance result based on the combined sensitivity measure.

* * * * *